United States Patent
Karlen et al.

(10) Patent No.: US 10,788,435 B2
(45) Date of Patent: Sep. 29, 2020

(54) FIXTURES FOR RADIOGRAPHICALLY IMAGING INDUSTRIAL ARTICLES

(71) Applicant: Hamilton Sundstrand Corporation, Charlotte, NC (US)

(72) Inventors: Eric W. Karlen, Rockford, IL (US); Daniel O. Ursenbach, Caledonia, IL (US); Claire Victoria Brennan, Roscoe, IL (US); Michael Hamilton Severson, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 294 days.

(21) Appl. No.: 15/850,314

(22) Filed: Dec. 21, 2017

(65) Prior Publication Data
US 2019/0195812 A1    Jun. 27, 2019

(51) Int. Cl.
*G01N 23/00*    (2006.01)
*G21K 5/08*    (2006.01)
(Continued)

(52) U.S. Cl.
CPC ..... *G01N 23/046* (2013.01); *G01N 2223/419* (2013.01)

(58) Field of Classification Search
CPC .......... A61K 31/506; G01N 2223/419; G01N 23/046; G01N 2223/309; G01N 23/083; G01N 2223/3306; G01N 2223/1006; G01N 23/04; G01N 23/087; G01N 23/10; G01N 17/00; G01N 1/00; G01N 2001/002; G01N 2223/1016; G01N 2223/627; G01N 23/043; G01N 23/185; G01N 2223/31; G01N 23/044; G01N 23/18; G01N 21/95607; G01N 2201/103; G01N 23/20075; A61B 6/0442; A61B 6/04; A61B 2090/3937; A61B 6/0421; A61B 6/0457; A61B 6/4092; A61B 6/4423; A61B 6/547; A61B 5/06; A61B 6/032; A61B 6/0407; A61B 6/0478; A61B 6/14; A61B 6/4035; A61B 6/4417; A61B 6/4233; A61B 6/4291; A61B 6/4441; A61B 6/484; A61B 6/502; A61B 2017/00212; A61B 2017/00221; A61B 2560/0271; A61B 2562/0247; A61B 2562/0261; A61B 2562/046; A61B 2562/17; A61B 5/0002; A61B 5/0006; A61B 5/031; A61B 5/14551; A61B 5/6887; A61B 6/107; A61B 6/12; A61B 6/4429;
(Continued)

(56) References Cited

U.S. PATENT DOCUMENTS 5,023,895 A * 6/1991 McCroskey ......... G01N 23/046
                                                              378/10
7,254,211 B2 * 8/2007 Hunt .................... G01N 23/046
                                                              378/20
(Continued)

*Primary Examiner* — Irakli Kiknadze
(74) *Attorney, Agent, or Firm* — Locke Lord LLP; Scott D. Wofsy; Joshua L. Jones

(57) ABSTRACT

An inspection fixture includes a base member, a support member coupled to base member, and an intermediate member coupled to the support member or the base member. The support member includes a radiolucent material for limiting artifacts in imagery of an industrial article supported by the inspection fixture. Inspection arrangements and imaging methods are also described.

18 Claims, 10 Drawing Sheets

(51) Int. Cl.
*H05G 1/00* (2006.01)
*G01N 23/046* (2018.01)

(58) Field of Classification Search
CPC ......... A61B 6/548; A61B 6/583; A61B 6/584;
A61B 6/0414; C07D 403/04; C07D
403/14; C07D 409/14; C07D 413/14;
G06K 2209/05; G06K 9/03; G06K 9/20;
G06K 9/3233; G01V 5/0016; G01T
7/005; G01T 7/10
USPC .......................... 378/4, 20, 68, 78, 205–208
See application file for complete search history.

(56) References Cited

U.S. PATENT DOCUMENTS

| | | | | |
|---|---|---|---|---|
| 7,551,714 | B2* | 6/2009 | Rothschild | G01N 23/046 378/44 |
| 8,494,114 | B2* | 7/2013 | Chen | G01V 5/00 378/57 |
| 9,194,822 | B2 | 11/2015 | Ho et al. | |
| 10,247,682 | B2* | 4/2019 | Schlecht | G01N 23/046 |
| 2004/0109532 | A1* | 6/2004 | Ford | G01V 5/005 378/57 |
| 2006/0083355 | A1* | 4/2006 | Loser | A61B 6/0442 378/208 |
| 2014/0072095 | A1* | 3/2014 | Feser | G01N 23/2206 378/4 |
| 2017/0023495 | A1 | 1/2017 | Santillan et al. | |

* cited by examiner

FIXTURES FOR RADIOGRAPHICALLY IMAGING INDUSTRIAL ARTICLES

BACKGROUND OF THE INVENTION

1. Field of the Invention

The present disclosure relates to radiographic inspection, and more particularly to fixtures for supporting industrial articles during radiographic inspections.

2. Description of Related Art

Non-destructive inspection techniques are commonly used in industrial settings to inspect structures like welds, gas turbine engine components, and printed circuit boards. Radiographic inspection techniques, such as x-ray three-dimensional (3D) computed tomography (CT), can be used during failure analysis and quality inspections to evaluate structures otherwise not accessible for inspection. Imagery from x-ray 3D CT inspections can provide information that otherwise is unavailable absent employment of destructive techniques, such as sectioning.

One challenge to radiographic inspection is supporting the structures during scanning. It is also necessary for an inspection fixture to be radiolucent such that the inspection fixture not alter imagery of the structure. In some applications it can be necessary that an inspection fixture have sufficient stiffness to resist movement of a structure during scanning to prevent movement of the structure from reducing the quality of images generated during scanning. And since structures can vary in size and shape, it can be necessary that the configuration of the inspection fixture accommodate structures of different sizes and shape.

Such conventional methods and systems have generally been considered satisfactory for their intended purpose. However, there is still a need in the art for improved inspection fixtures, arrangements, and inspection methods for industrial articles. The present disclosure provides a solution for this need.

SUMMARY OF THE INVENTION

An inspection fixture includes a base member, a support member coupled to the base member, and an intermediate member coupled to the support member or the base member. One or more of the base member and the support member include a radiolucent material for limiting artifacts in imagery of an industrial article supported by the inspection fixture.

In certain embodiments the base member can be electrically conductive. The support member can be electrically conductive. The intermediate member can be electrically conductive. One or more of the members can include carbon fiber or carbon black. The base member can include a polymeric material. The support member can include an electrically insulative material with an electrically conducive sheath.

In accordance with certain embodiments, the inspection fixture can include a stiffener. The stiffener can define a fastener pattern. The intermediate member can include a radiolucent band or strap. The radiolucent band or strap can be coupled to the support member at a location above the base member. Polymer tape or fasteners can couple the radiolucent band or strap to the support member. The base member can include two or more lateral flanges connected to a backing.

It is contemplated that the base member can define an array of blind apertures with the surface of the base member. The support member can include a tube. The tube can be slidably received with a blind aperture of the base member. Couplers can be fitted about the support member in an interference fit. The couplers can abut the surface. The couplers can fix the support member in the blind aperture such that an end of the support member is spaced apart from a lower portion of the blind aperture. An end cap can be coupled to an end of the support member opposite the base member.

It is also contemplated that, in accordance with certain embodiments, the support member can be orthogonal relative the base member. The support member can be parallel to the base member. The support member can be oblique relative to the base member. A back plate can couple the support member to the base member. The support and members can be spaced apart. An inspection arrangement includes an inspection fixture as described above, an x-ray source arranged on one side of the inspection fixture, an x-ray detector spaced on another side of the inspection fixture, and a drive mechanism. The x-ray source and the x-ray detector define an inspection axis that intersects the inspection fixture. The drive mechanism is operably coupled to the inspection fixture for displacing the inspection fixture relative to the inspection axis.

In certain embodiments the base member, the support member and the intermediate member can each include a radiolucent carbon material. A radiopaque stiffener defining a fastener pattern can be coupled to the base member. In accordance with certain embodiments, the base member can include a three-dimensionally modeled polymer body. The support member can include a foam core with an epoxy and carbon fiber fabric skin disposed thereon. The intermediate member can include a radiolucent strap.

It is contemplated that, in accordance with certain embodiments, a surface of the base member can define an array of blind apertures. The support member can include a carbon fiber tube slidably received within a blind aperture of the aperture array. The intermediate member can include a first intermediate member fixed to the surface of the base member at a location adjacent to the blind aperture and a second intermediate member coupled to the U-lock with the support member arranged therebetween, the first and second intermediate member fixing the support member to the base member.

An imaging method includes securing an industrial article to the support member of an inspection fixture as described above. The industrial article is grounded through the support member and displaced relative to an x-ray source and x-ray detector. Image data of the industrial article is generated using x-ray communicated through the support member and the industrial article.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
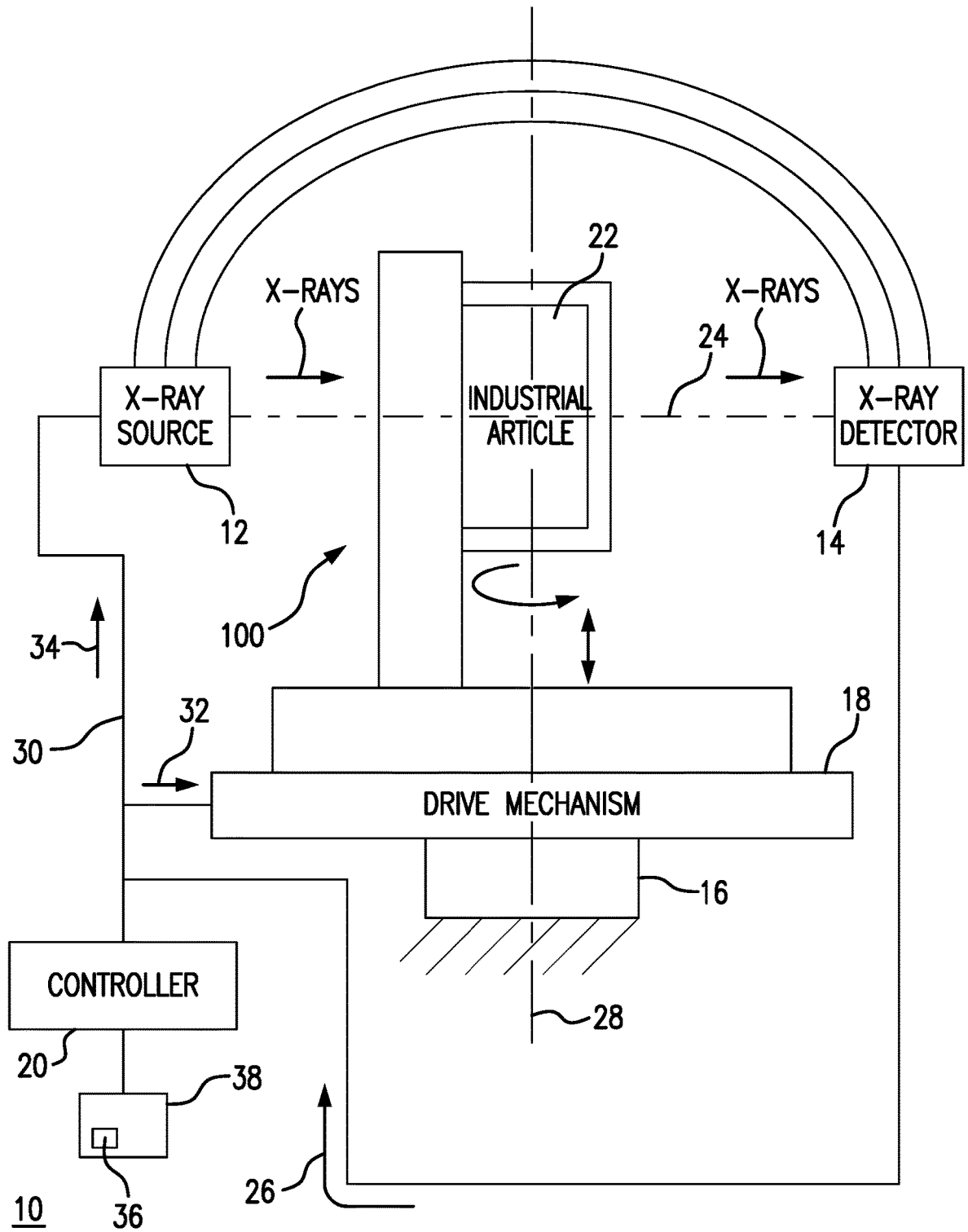
FIGS. 1 and 2 are side elevation and exploded views of an exemplary embodiment of a radiographic inspection apparatus according to the present disclosure, showing an industrial article supported in an inspection fixture between an x-ray source and an x-ray detector.

Reference will now be made to the drawings wherein like reference numerals identify similar structural features or aspects of the subject disclosure. For purposes of explanation and illustration, and not limitation, a partial view of an exemplary embodiment of an inspection fixture in accordance with the disclosure is shown in FIG. 1 and is designated generally by reference character 100. Other embodiments of inspection fixtures, inspection arrangements, and imaging methods in accordance with the disclosure, or aspects thereof, are provided in FIGS. 2-11, as will be described. The systems and methods described herein can be used for radiographically imaging industrial articles using computed tomography (CT), such as gas turbine engine and printed circuit boards (PCBs) industrial articles, though the present disclosure is not limited to CT imaging or to industrial article imaging in general.

Referring to FIG. 1, an inspection arrangement 10 is shown. Inspection arrangement 10 includes an x-ray source 12, an x-ray detector 14, a drive mechanism 16, a stage 18, and controller 20. Inspection fixture 100 with an industrial article 22 supported therein is seated on stage 18. X-ray source 12 is arranged on one side of inspection fixture 100. X-ray detector 14 is arranged on a side of inspection fixture 100 opposite x-ray source 12, x-ray source 12 and x-ray detector 14 defining between one another an inspection axis 24.

X-ray source 12 and x-ray detector 14 are configured for imaging industrial articles. In this respect x-ray source 12 can have an output energy level between about 3 and 85 watts. For example, in embodiments where industrial article 22 is a structure like a gas turbine engine fuel injector, x-ray source 12 can have an output energy level that is between about 40 and 75 watts. Alternatively, in embodiments where industrial article 22 is a structure like a PCB, x-ray source 12 can have an output energy level that is between about 10 and 25 watts.

Drive mechanism 16 is connected to stage 18 for displacing inspection fixture 100 relative to inspection axis 24. Controller 20 is operably connected to drive mechanism 16 and x-ray source 12, and is disposed in communication with x-ray detector 14. Communication and operable control are via a link 30 connecting controller 20 with drive mechanism 16, x-ray source 12 and x-ray detector 14. Link 30 allows for collecting image data 26 of industrial article 22 by moving inspection fixture 100 relative to inspection axis 24, e.g., by axial displacement of inspection fixture 100 along a movement axis 28 and rotation of inspection fixture 100 about movement axis 28, using movement signals 32 and exposure signals 34.

It is contemplated that industrial article 22 include (or consist essentially of) an inanimate object. In this respect industrial article 22 can include a gas turbine engine component or electrical system component, such as fuel injector or controller. For example, in certain embodiments industrial article 22 includes a manifold 40 (shown in FIG. 3) or a PCB 42 (shown in FIG. 5). As will be appreciated by those of skill in the art in view of the present disclosure, industrial articles can require x-ray doses that differ from those appropriate for imaging structures with high moisture content, e.g., tissue, requiring that a radiolucent material 108 forming inspection 100 be tolerant to such x-ray exposure.

Figure 2:
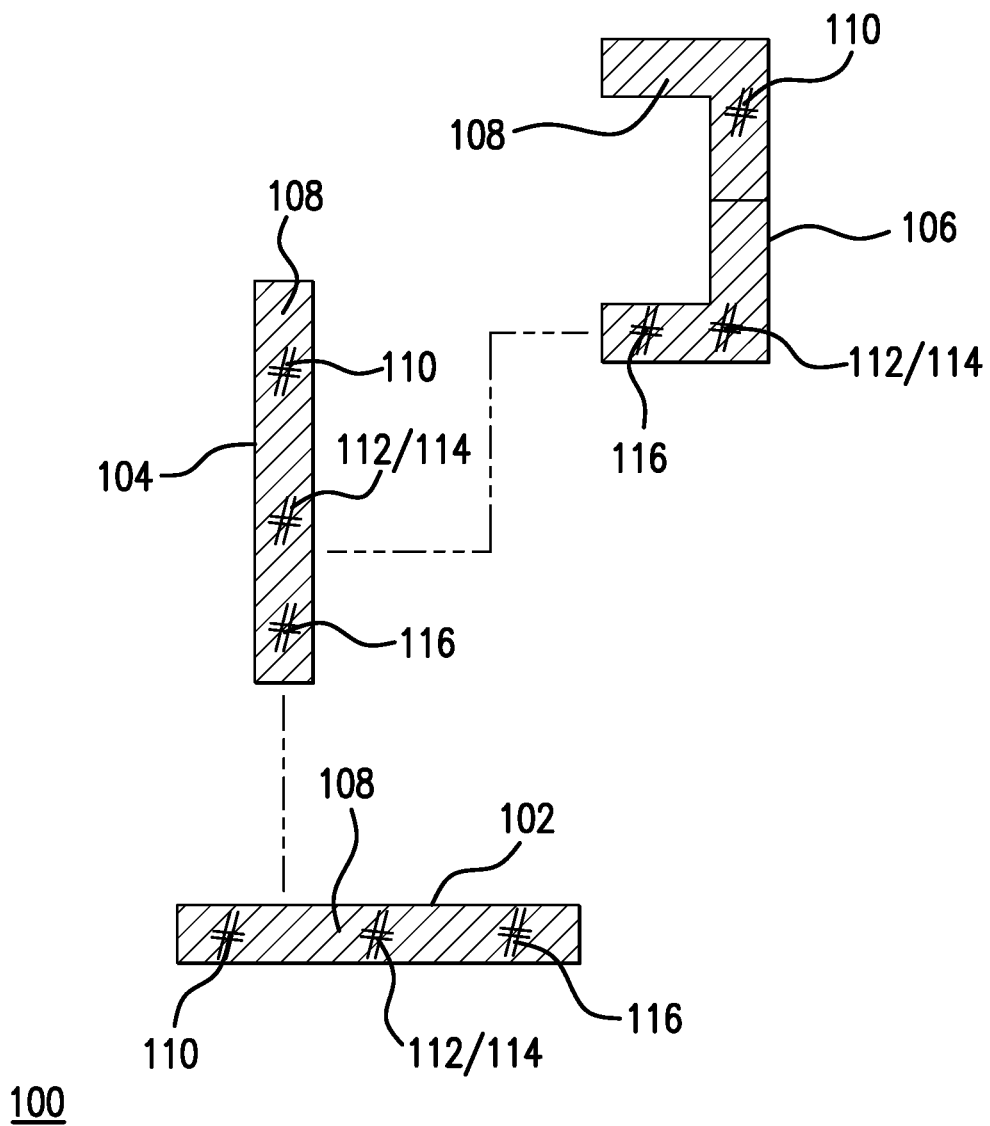

With reference to FIG. 2, inspection fixture 100 is shown. Inspection fixture 100 includes a base member 102, a support member 104, and an intermediate member 106. Support member 104 is coupled to base member 102. Intermediate member 106 is coupled to support member 104 and/or base member 102. One or more of base member 102, support member 104 and intermediate member 106 includes radiolucent material 108. As used herein radiolucent means substantially transparent to x-ray radiation at energy levels suitable for imaging a contemplated industrial article for a given material composition and arrangement. For example, radiolucent material 108 can have a mass attenuation coefficient (MAC) per unit thickness resulting from excitation of about 50 keV that is between about 0.25 $cm^2/g \cdot m$ to about 0.19 $cm^2/g \cdot m$, rendering inspection fixture 100 suitable for imaging industrial articles formed from metallic and non-metallic materials. In certain embodiments, radiolucent material 108 can have the MAC per unit thickness can be about 0.25 $cm^2/g \cdot m$ for imaging industrial articles like gas turbine engine fuel injectors. In certain embodiments, radiolucent material 108 can have a radio density that is below about 0.20 $cm^2/g \cdot m$, rendering inspection fixture 100 suitable for imaging industrial articles like PCBs.

Radiolucent material 108 imparts substantially no attenuation to x-ray radiation passing through the one or more of base member 102, support member 104 and intermediate member 106 formed from radiolucent material 108. In the illustrated arrangement of inspection fixture 100 support member 104 connects to base member 102 and intermediate member 106 connects to support member 104, intermediate member 106 thereby being coupled to base member 102 by support member 104. In certain embodiments, each of base member 102, support member 104 and intermediate member 106 include radiolucent material 108. As will be appreciated by those of skill in the art in view of the present disclosure, limiting attenuation of the x-ray radiation reduces (or eliminates entirely) artifacts 36 (shown in FIG. 1) in imagery 38 (shown in FIG. 1) acquired of industrial article 22 (shown in FIG. 1) while supported by inspection fixture 100 during imaging.

In certain embodiments one or more of base member 102, support member 104 and intermediate member 106 include a carbon composite material 110. In addition to being suitable radiolucent, carbon composite carbon 110 is structurally stiff. In this respect it is contemplated that stiffness provided by carbon composite material 110 have stiffness to prevent movement of industrial article 22 (shown in FIG. 1) during imaging from inducing artifacts 36 (shown in FIG. 1) in imagery 38 (shown in FIG. 1) acquired of industrial article 22 (shown in FIG. 1) while supported by inspection fixture 100 during imaging. Examples of suitable carbon composite materials include composites formed from carbon fiber 112 and a resin 114, which can provide both radiolucency and stiffness to limit (or eliminate entirely) artifacts 36 in imagery 38 acquired of industrial article 22 while supported by inspection fixture 100 during imaging.

In accordance with certain embodiments, one or more of base member 102, support member 104 and intermediate member 106 include carbon black 116. Carbon black 116 reduces the electrical resistivity of materials incorporating the material, allowing transient charges to dissipate through the one or more of base member 102, support member 104 and intermediate member 106 including carbon black 116. This can be advantageous when imaging articles sensitive to electrostatic discharge, such as electrical devices like printed circuit boards and integrated circuits, the reduced resistivity of the structure dissipating static charge at potentials below that sufficient to damage the electrical device being imaged. It is contemplated that, in certain embodiments, that inspection fixture 100 include carbon black 116 is a quantity sufficient that inspection fixture 100 effectively ground article 22 to dissipate static charge. The grounding through inspection fixture can be such that no discrete ground path (such as a ground strap) be required when imaging article 22.

Figure 3:
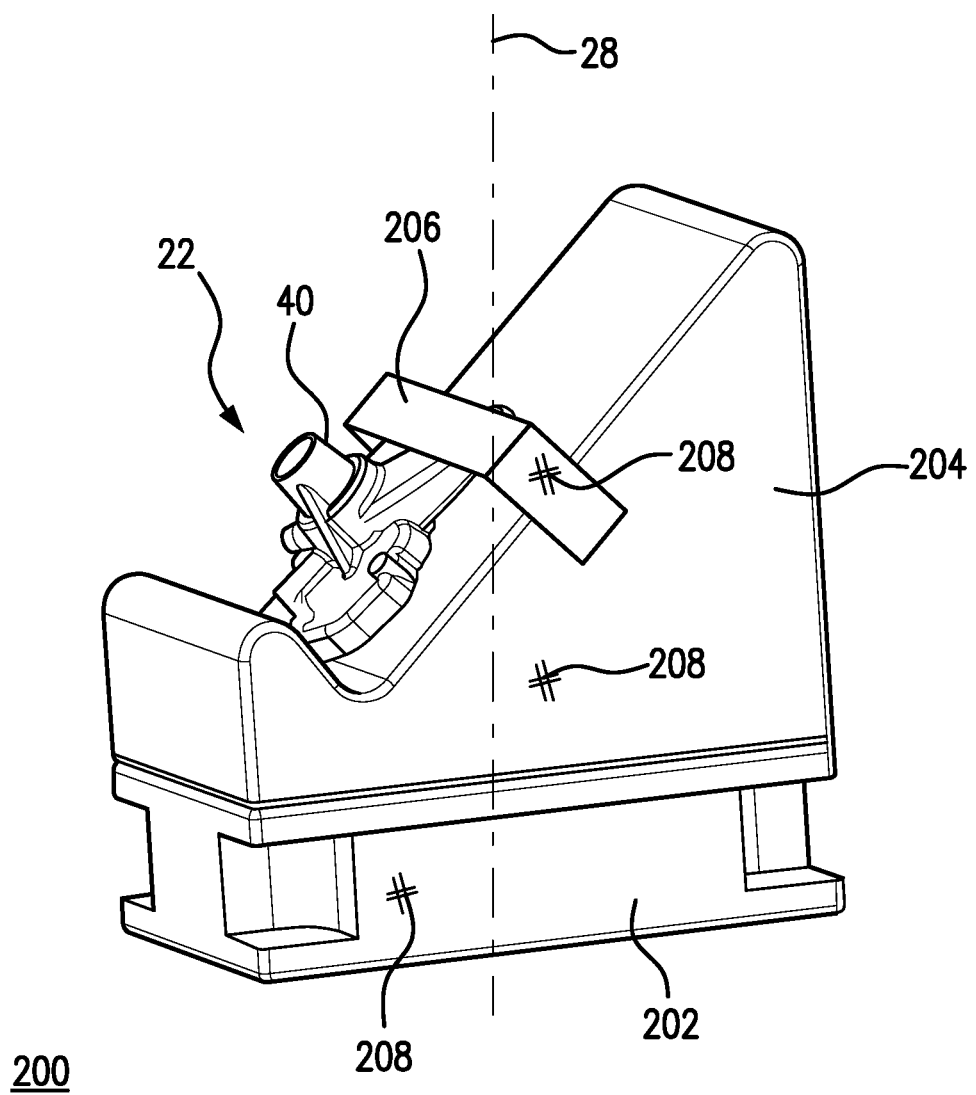
FIGS. 3 and 4 are perspective and exploded views of the inspection fixture of FIG. 1 according to a first embodiment, showing a composite support member seated on three-dimensionally modelled base member for supporting a gas turbine engine industrial article between the x-ray source and x-ray detector, respectively.
Figure 4:
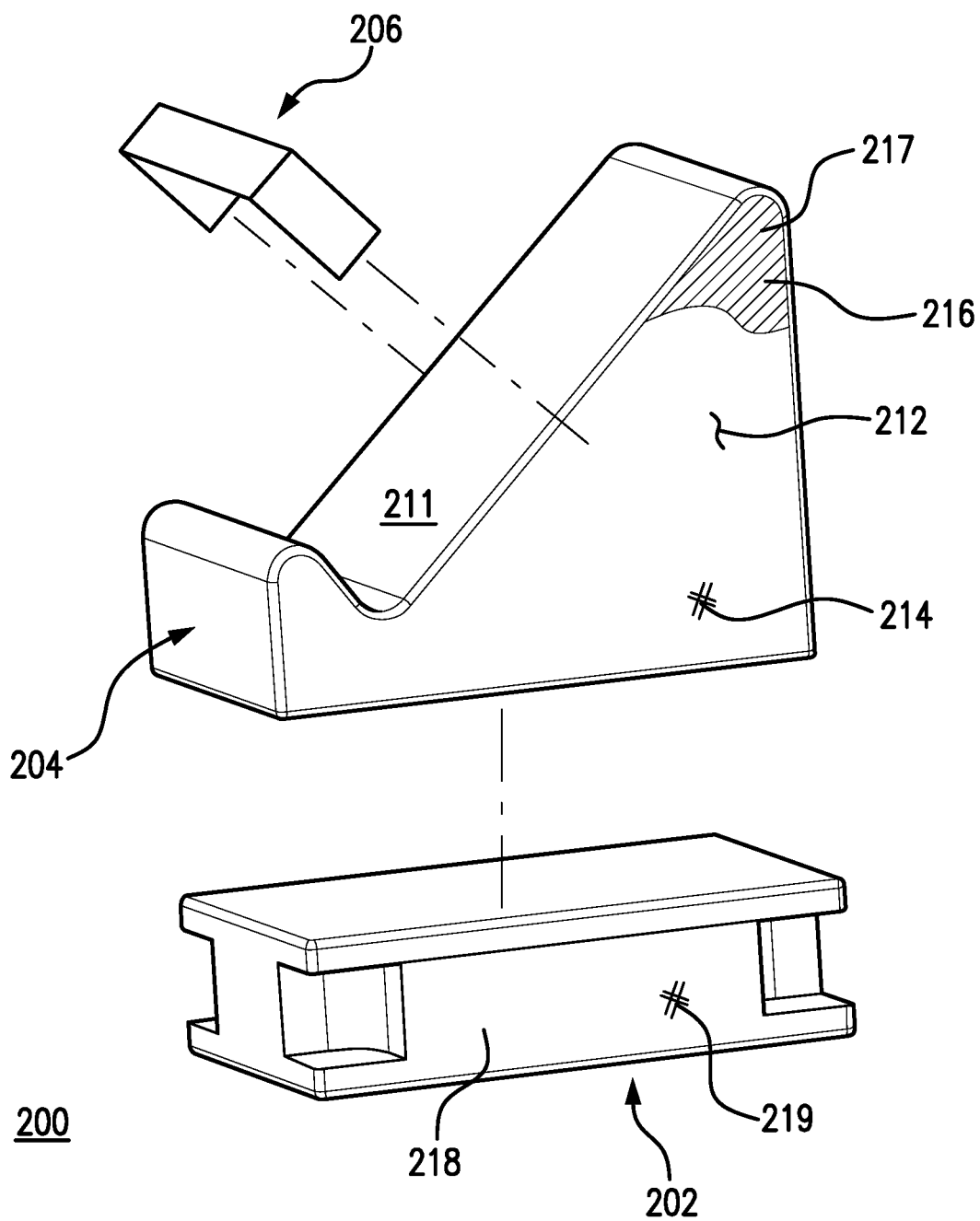

With reference to FIGS. 3 and 4, an inspection fixture 200 is shown. Inspection fixture 200 is similar to inspection fixture 100 and additionally includes a base member 202, a support member 204 coupled to base member 202, and an intermediate member 206 coupled to support member 204. Support member 204 includes a radiolucent material 208 for limiting artifacts 36 (shown in FIG. 1) in imagery 38 (shown in FIG. 1) of industrial article 22 supported by inspection fixture 200.

As shown in FIG. 3 industrial article 22 includes a gas turbine engine component 40. Gas turbine engine component 40 is supported at an oblique angle relative to movement axis 28, which can be a 45-degree angle, or any other angle, as suited for an intended application.

Intermediate member 206 is connected to support member 204 and compressively urges industrial article 22 against support member 204. It is contemplated that intermediate member 206 optically obscure only a portion of engine or electrical system component 40, portions of engine or electrical system component 40 being optically accessible such that an operator be able to orient inspection fixture 200 relative to inspection axis 24 for acquiring imagery 26 (shown in FIG. 1) of structure or interest in engine or electrical system component 40. In certain embodiments intermediate member 206 includes a strap or resilient member to retain industrial article 22 against support member 204 during scanning. In accordance with certain embodiments one or more of base member 202, support member 204, and intermediate member 206 includes a radiolucent material 210 to limit artifacts 36 (shown in FIG. 1) in imagery 38 (shown in FIG. 1) of industrial article 22 during imaging.

Referring to FIG. 4, support member 204 defines a tray 211 for supporting industrial article 22 (shown in FIG. 1). Tray 211 defines a profile that is generally L-shaped and is bounded by sheath 212. Sheath 212 includes a composite material 214 overlaying core 216. Core 216 can include a foam material 217, which can be electrically insulative. It is contemplated that at least sheath 212 have relatively low resistance, e.g., be electrically conductive, for dissipating static electricity and/or grounding industrial article 22 during imaging. In certain embodiments, both core 216 and sheath 212 are radiolucent, thereby reducing (or eliminating) the introduction of artifacts 36 (shown in FIG. 1) in imagery 38 (shown in FIG. 1) acquired of industrial article 22 (shown in FIG. 1) during imaging of industrial article 22.

Base member 202 includes a three-dimensionally (3D) modeled body 218. In certain embodiments base member 202 can include a polymeric material 219. Use of polymeric material 219 allows base member 202 to provide stiffness suitable to resist unintended movement of industrial article 22 (shown in FIG. 1) during imaging, such as during movement of inspection fixture 200 during scanning. It is contemplated that base member 202 be formed using an additive manufacturing technique, such as a stereo lithography, simplifying fabrication and accommodating geometry necessary to support industrial article 22. As will be appreciated by those of skill in the art in view of the present disclosure, base members defined using 3D modelling and formed using a polymeric material, such as using an additive manufacturing material, can cooperate with support member 204 to provide stiffness suitable to support industrial article 22 during imaging to limit (or prevent entirely) introduction of artifacts 36 in imagery 26 (shown in FIG. 1) acquired of industrial article 22.

Figure 5:
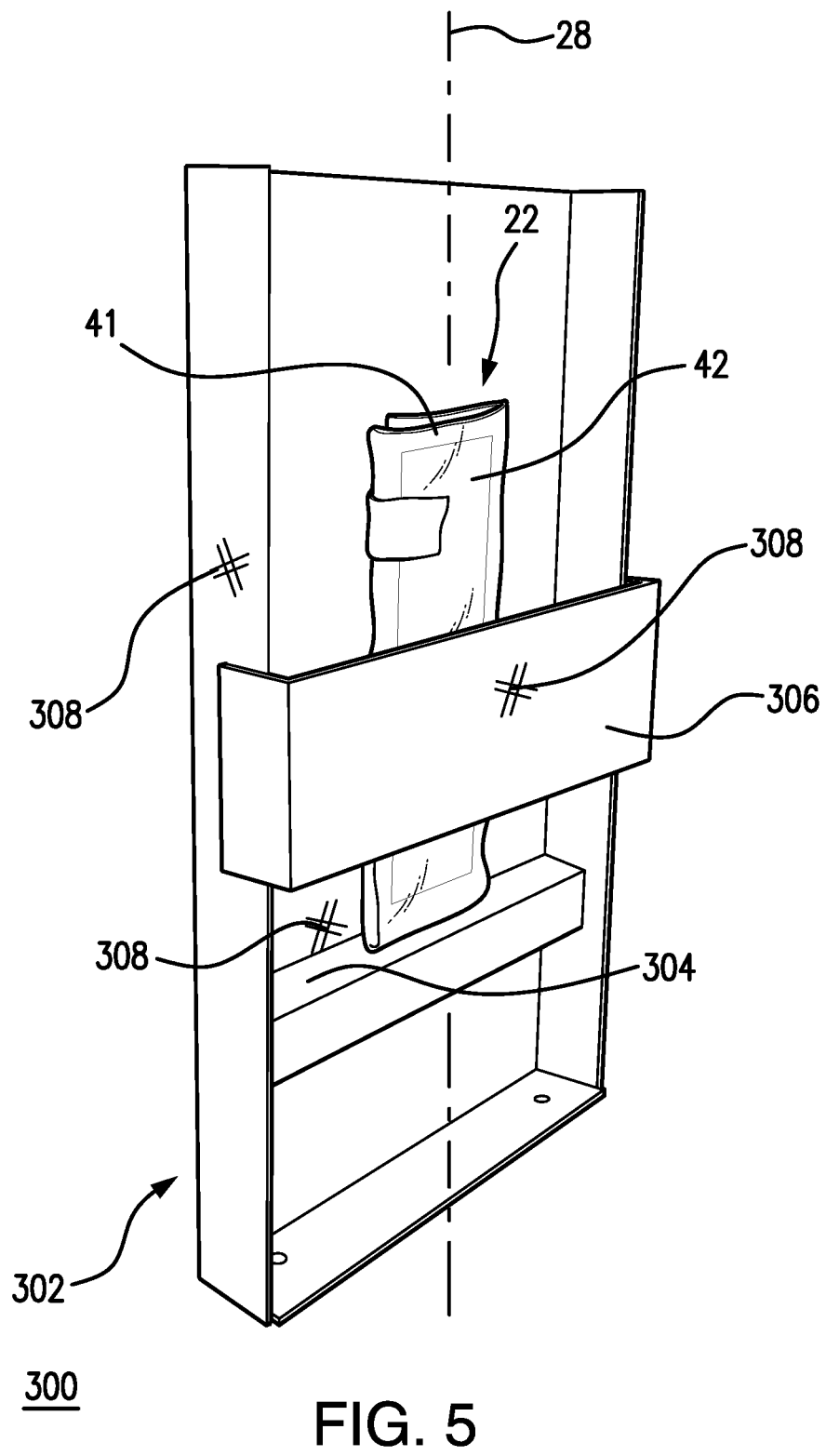
FIGS. 5 and 6 are perspective and exploded views of the inspection fixture of FIG. 1 according to a second embodiment, showing a support member and an intermediate member coupled to a base member for supporting a printed circuit board (PCB) industrial article between the x-ray source and x-ray detector, respectively.
Figure 6:
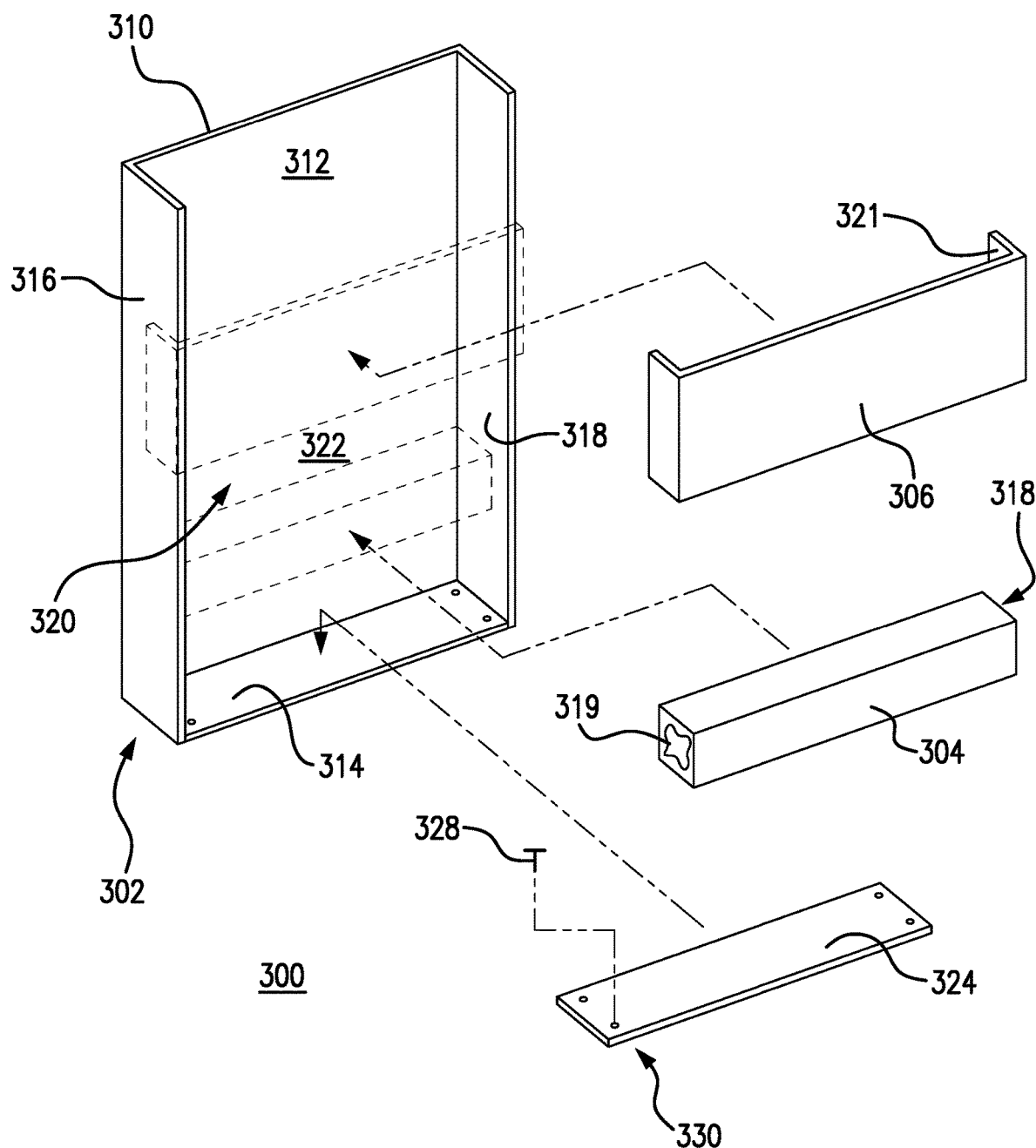
Figure 7:
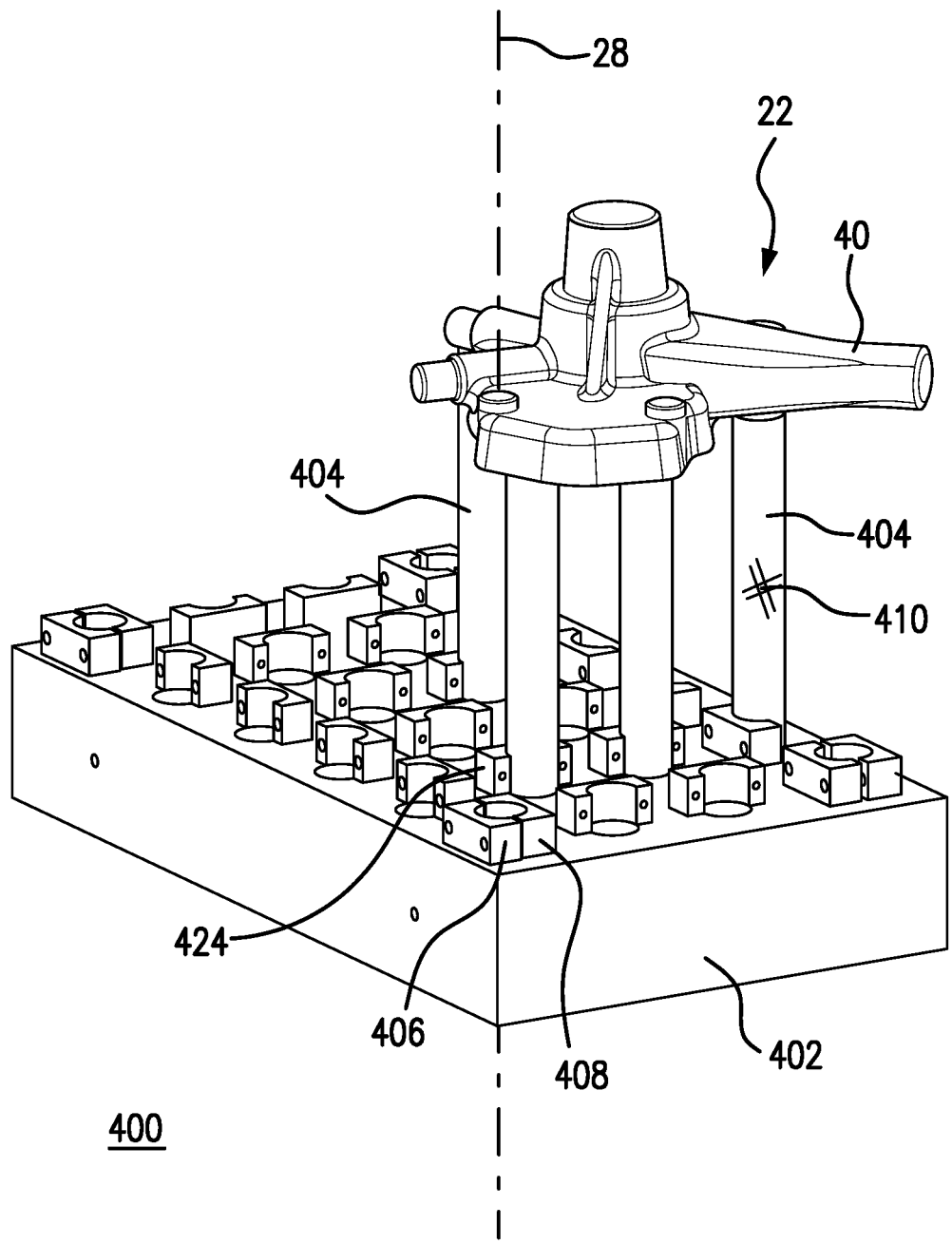
FIGS. 7-10 are perspective and exploded views of the inspection fixture of FIG. 1 according to a third embodiment, showing a plurality of support member and intermediate members coupled to a base member for supporting a gas turbine engine article industrial article between the x-ray source and x-ray detector, respectively.

With reference to FIGS. 5 and 6, an inspection fixture 300 is shown. Inspection fixture 300 is similar to inspection fixture 100 (shown in FIG. 1) and includes a base member 302, a support member 304, and an intermediate member 306. Support member 304 is coupled to base member 302 and intermediate member 306 is coupled to the support member 304 by base member 302. One or more of base member 302, support member 304, and intermediate member 306 include a radiolucent material 308 for limiting artifacts 36 (shown in FIG. 1) in imagery 38 (shown in FIG. 1) of industrial article 22 supported by inspection fixture 300.

PCB assembly 42 is supported by inspection fixture 300, PCB assembly 42 being sealed within anti-static package 41 electrically grounded through inspection fixture 300. As will be appreciated by those of skill in the art in view of the present disclosure, employment of radiolucent material 308 enables PCB assembly 42 to be imaged without removal from anti-static package 41, reducing the likelihood of damage to PCB assembly during imaging.

Referring to FIG. 6, base member 302 has a generally planar body 310 arranged along movement axis 28 (shown in FIG. 5). Planar body 310 includes a backing 312, a footer 314, a first lateral flange 316, and a second lateral flange 318. Backing 312 is substantially planar and is arranged in parallel to movement axis 28. First lateral flange 316 and second lateral flange 318 are connected to backing 312 on lateral edges on opposite sides of movement axis 28 to provide stiffness to planar body 310. Footer 314 is connected to a longitudinal end of planar body 310 and is substantially orthogonal to movement axis 28. On opposite ends backing 312 connects to first lateral flange 316 and second lateral flange 318.

Support member 304 is connected to planar body 310 at a longitudinal location offset from footer 314. At opposite ends support member 304 connects to first lateral flange 316 and second lateral flange 318. Along a lateral edge support member 304 connects to backing 312. It is contemplated that support member 304 can be received within slots defined in backing 312 or fixed with an adhesive or resin 319, as suitable for an intended application.

Intermediate member 306 laterally spans planar body 310 at a location longitudinally offset from support member 304 along movement axis 28 (shown in FIG. 5). More particularly, intermediate member 306 laterally spans planar body 310 on a side of support member 304 opposite footer 314. A gap 320 is defined between intermediate member 306 and support member 304 such that a pocket 322 is optically accessible, pocket 322 being bounded by base member 302, support member 304 and intermediate member 306. As will be appreciated by those of skill in the art in view of the present disclosure, provision of gap 320 allows for positioning inspection fixture 300 relative to inspection axis 24 (shown in FIG. 1) manually, a user being able to scan discrete components or region of PCB 42 (shown in FIG. 5) by manipulating stage 18 (shown in FIG. 1) to position inspection fixture 300 such that the discrete component or region of PCB 42 is intersected by inspection axis 24. Opposite ends of intermediate member 306 laterally overlap first lateral flange 316 and second lateral flange 318 to fix intermediate member 306 to base member 302. Fixation can be with an adhesive, resin, a polymeric fastener, or tape 321 disposed on opposite ends of intermediate member 306, as suitable for a given application.

In certain embodiments inspection fixture 300 includes a stiffener 324. Stiffener 324 includes a material 326 with rigidity greater than that of base member 302, which can include a steel or aluminum material by way of non-limiting example. Stiffener 324 laterally spans planar body 310 and overlaps footer 314. It is contemplated that stiffener 324 secure inspection fixture 300 to stage 18 (shown in FIG. 1), such as with one or more fasteners 328 received within a fastener pattern 330 and within stage 18. This allows inspection fixture 300 to present PCB 42 (shown in FIG. 5) vertically on stage 18 relative to gravity for movement relative to inspection axis 24.

With reference to FIGS. 7-10, an inspection fixture 400 is shown. Inspection fixture 400 is similar to inspection fixture 100 (shown in FIG. 1) and includes a base member 402, one or more support member 404, a first intermediate member 406, and a second intermediate member 408 Support member 404 is coupled to base member 402. First intermediate member 406 and second intermediate member 408 are coupled to base member 402. Support member 404 includes a radiolucent material 410 for artifacts 36 (shown in FIG. 1) in imagery 38 (shown in FIG. 1) of an industrial article 22 supported by inspection fixture 400 as inspection fixture 400 and industrial article 22 are moved along movement axis 28.

Figure 8:
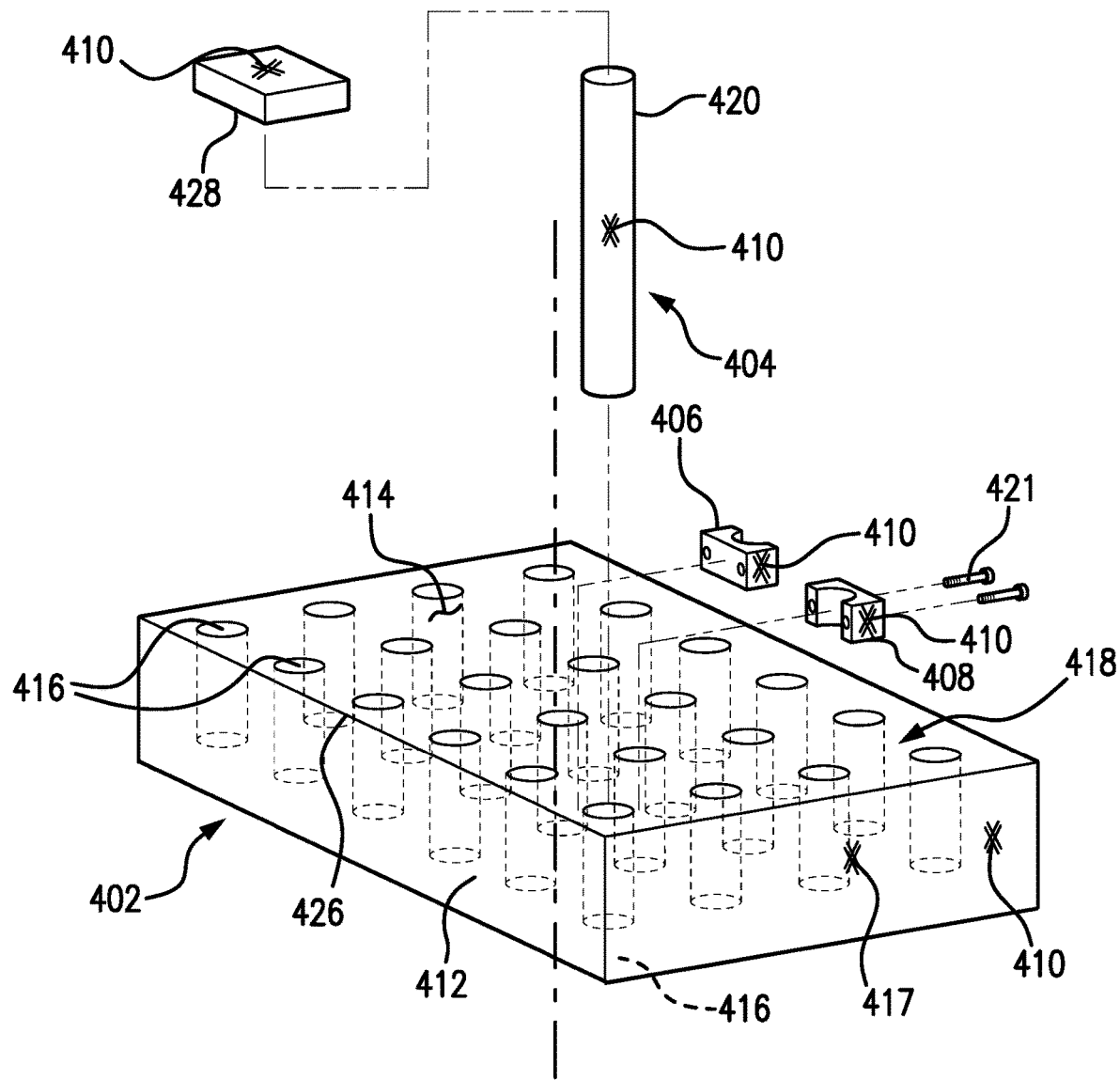

Referring to FIG. 8, base member 402 includes a body 412 with an article surface 414. One or more blind apertures 416 are defined by article surface 414, the one or more blind apertures 416 extending into and terminating within body 412. It is contemplated that base member 402 include a polymeric material 417, which can include radiolucent material 410, and be fabricated using an additive manufacturing technique. In certain embodiments base member 402 includes a plurality of blind apertures 416, respective blind apertures 416 each providing a seat to receive an end of support member 404 within base member 402. In the illustrated exemplary embodiments base member 402 includes a blind aperture array 418 of twenty-four blind apertures 416 distributed within four rows and six columns spaced on a uniform x-y pitch, allowing for reconfiguration of inspection fixture 400 to support a plurality of industrial articles in imaging arrangement 10 (shown in FIG. 1) by distributing one or more support member 404 within array 418 in a pattern suitable for the geometry and desired orientation of industrial article 22. As will be appreciated by those of skill in the art in view of the present disclosure, base member 402 can have fewer than twenty-four or more than twenty-four blind apertures 416, as suitable for an intended application.

Each support member 404 is slidably received within a respective blind aperture 416 such that a respective first intermediate member 406 abuts the support member 404 along a portion of its longitudinal length. Each support member 404 has a tube body 420 formed from radiolucent material 410. Examples of suitable radiolucent materials include carbon fiber composite material. As will be appreciated by those of skill in the art in view of the present disclosure, carbon fiber composite materials can provide stiffness sufficient to prevent unintended movement of industrial article 22 (shown in FIG. 7) during imaging, e.g., while being translated and/or rotated along movement axis 24 (shown in FIG. 7) during CT scanning.

First intermediate member 406 is arranged on base member article surface 414 adjacent to blind aperture 416. Second intermediated member 408 is arranged on side of blind aperture 416 opposite first intermediate member 406, and is fixed to first intermediate member 406 with support member 404 fixed therebetween. Fixation can be way of one or more fasteners 421, the one or more fasteners 421 fixing support member 404 in an interference fit. The inference fit allows for height of tube member 420 to be adjusted to select an orientation of industrial article 22 and/or to accommodate non-uniform geometries without requiring support members cut to non-uniform heights and/or additional parts.

In certain embodiments one of first intermediate member 406 and second intermediate member 408 can be permanently fixed relative to base member 402. The other of first intermediate member 406 and second intermediate member 408 can be removably fixed to base member 402 via fasteners 421. As will be appreciated by those of skill in the art, fixation of first intermediate member 406 or 408 can simplify setup of inspection fixture 400 for imaging industrial article 22 (shown in FIG. 1) by reducing the number of parts necessary to provide support to industrial article 22, simplifying configuration and reconfiguration of inspection fixture 400 for imaging industrial articles of varying sizes and shapes. Fixation of one of first intermediate member 406 and second intermediate member 408 can be permanently fixed relative to base member 402 can be with an adhesive, a resin, or fastener. In certain embodiments, fixation can be by defining first intermediate member 406 integrally on article surface 414 as a unitary (i.e. inseparable) structure, such as by forming both structures coincidently in a commonly additive manufacturing process.

In accordance with certain embodiments, an intermediate member 424 (shown in FIG. 7) adjacent to first intermediate member 406 can be arranged at a different orientation relative to first intermediate member 406 about movement axis 24, providing space for fixation of second intermediate member 408 for a user or a tool. In the illustrated exemplary embodiment, intermediate members arranged adjacent to lateral and longitudinal edges are arranged such that respective intermediate members open away from movement axis 24; intermediate members located at interior positions open toward a single longitudinal edge 426 of article surface 414.

In certain embodiments, an end cap 428 can be arranged on an end on support member 404 opposite base member. End cap 428 can be arranged to support industrial article 22, for example, by distributing force communicated by support member 404 to industrial article 22. In accordance with certain embodiments, end cap 428 can include radiolucent material 410, such as a carbon fiber composite material.

Figure 9:
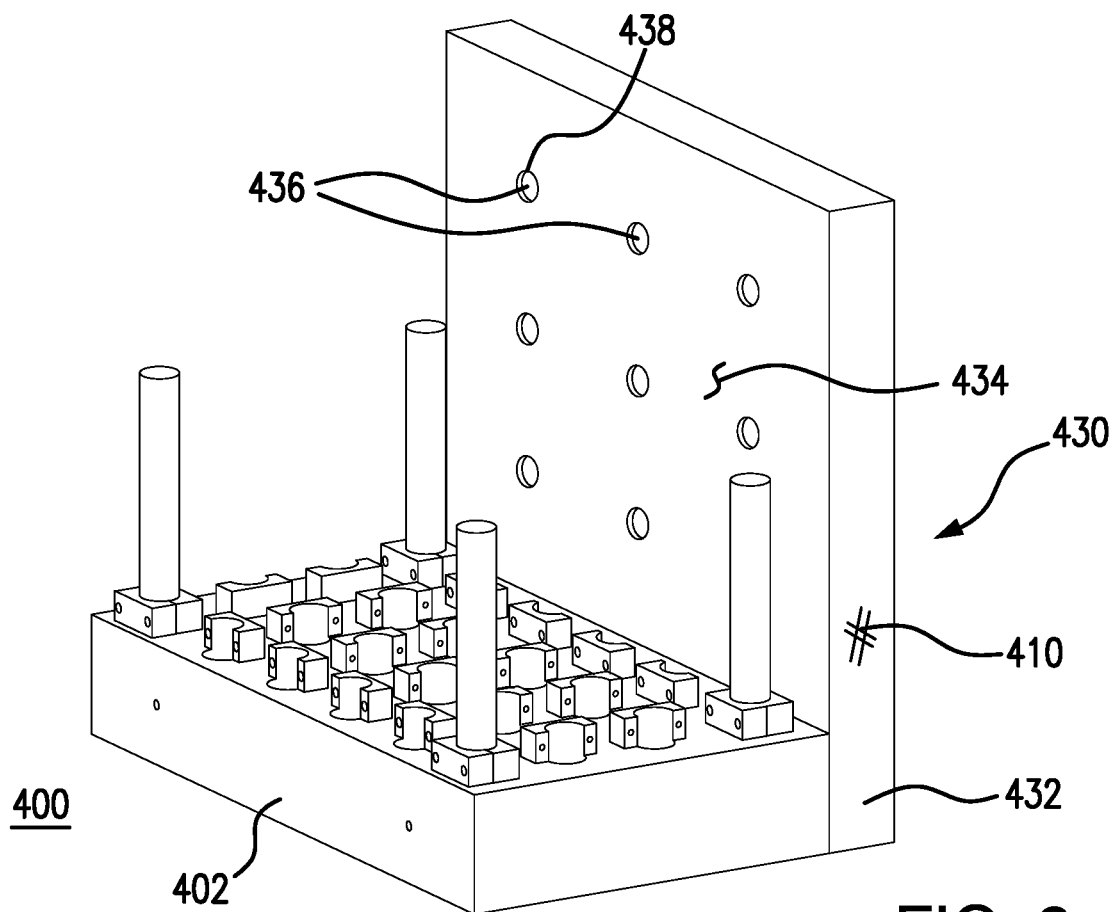

Referring to FIG. 9, inspection fixture 400 is shown with an optional backing member 430. Backing member 430 is formed from radiolucent material 410 and has a backing body 432 with a backing surface 434. Backing surface 434 defines an array 436 of through-apertures 438 which extend through backing member 430. It is contemplated that respective through-apertures 438 have diameters sized to securely seat one or more horizontal support members 440 (shown in FIG. 10) in an orientation substantially orthogonal to movement axis 24 (shown in FIG. 1) and parallel to base member 402. As will be appreciated by those of skill in the art in view of the present disclosure, the one or more horizontal support member 440 seated in backing member 430 can provide additional support to industrial article 22 (shown in FIG. 1).

Figure 10:
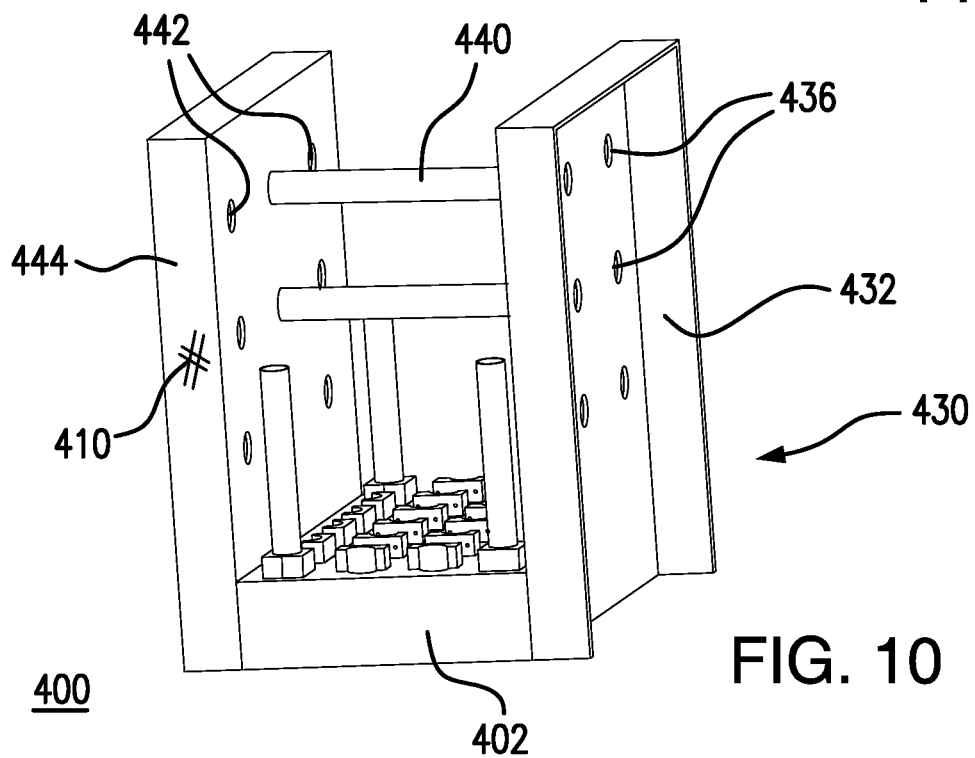

Referring to FIG. 10, in certain embodiments backing member 430 can be a first backing member 430 and inspection fixture 400 can include a second backing member 444. Second backing member 444 is similar to first backing member 430 and is coupled to base member 402 on a side of base member 402 opposite first backing member 430 such that an through-apertures of a through aperture array 442 of second backing member 440 are registered to respective through-apertures of through-aperture array 436 of first backing member 430. Registration allows for second support member 440 to be simply supported by both first backing member 430 and second backing member 440, rendering inspection fixture 400 suitably stiff to support industrial article 22 (shown in FIG. 1) without movement of industrial article 22 and inspection fixture 400 introducing artifacts 36 (shown in FIG. 1) in imagery 38 (shown in FIG. 1) or industrial article 22.

Figure 11:
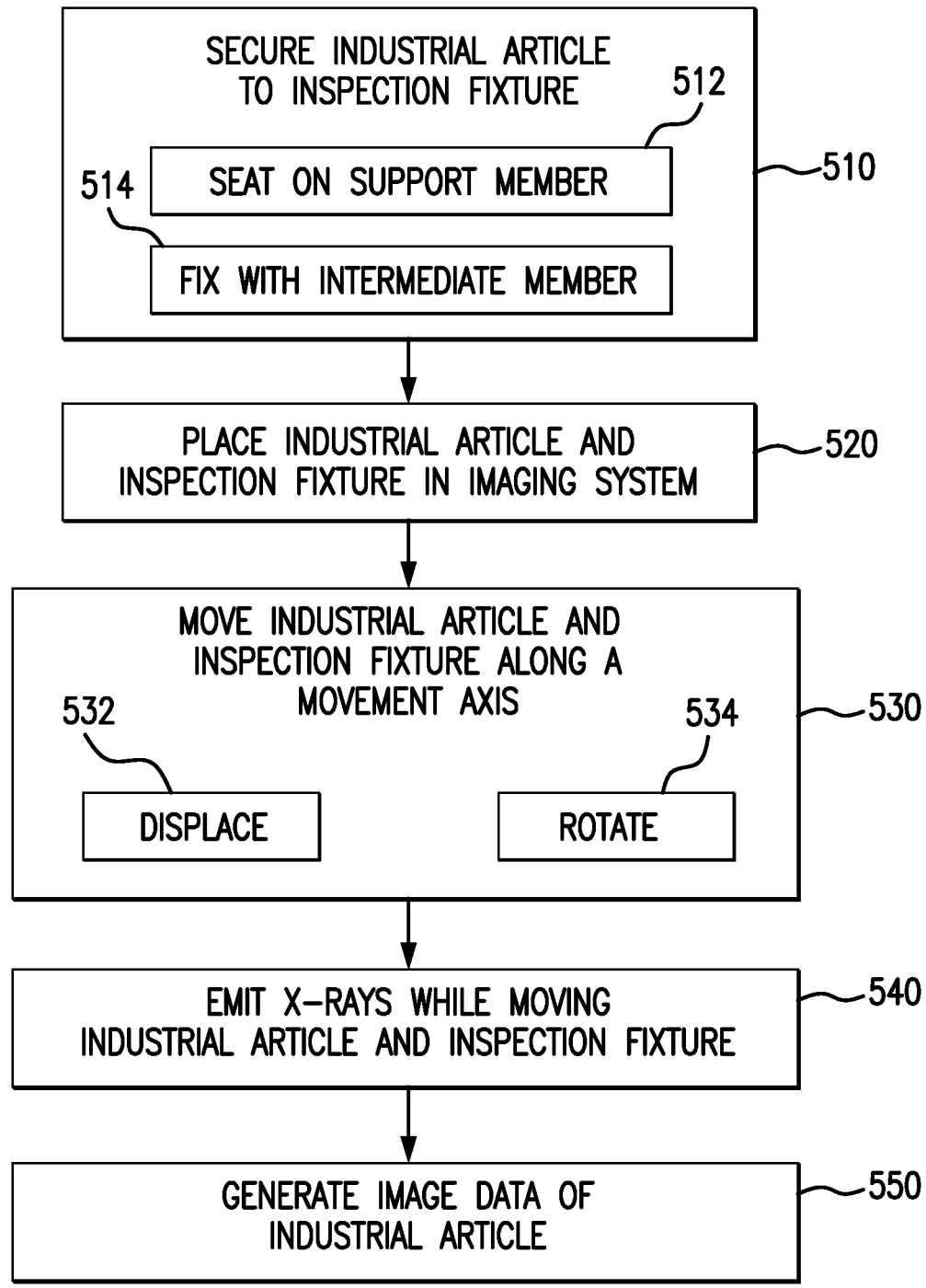
FIG. 11 is a block diagram of a method of radiographically inspecting an industrial article, showing steps of the method.

With reference to FIG. 11, an imaging method 500 is shown. Imaging method 500 includes securing an industrial article, e.g., industrial article 22 (shown in FIG. 1) an inspection fixture, e.g., inspection fixture 100 (shown in FIG. 1), as shown with box 510. Securing the industrial article to the inspection fixture can include seating the industrial article on a support member, e.g., support member 104 (shown in FIG. 1), as shown with box 512. Securing the industrial article to the inspection fixture can include fixing the industrial article to the support member with an intermediate member, e.g., intermediate member 106 (shown in FIG. 1), as shown with box 514.

The inspection fixture and industrial article are then placed in an imaging system, e.g., imaging system 10 (shown in FIG. 1), as shown with box 520. The inspection fixture and industrial article are then displaced and/or rotated relative to a movement axis, e.g., movement axis 28 (shown in FIG. 1), as shown with box 530. In certain embodiments x-rays emitted by an x-ray source, e.g., x-ray source 12 (shown in FIG. 1), traverse to the industrial article and inspection fixture along an inspection axis, e.g., inspection axis 24 (shown in FIG. 1), and are received by an x-ray detector, e.g., x-ray detector 14 (shown in FIG. 1), as the industrial article and inspection fixture are displaced and/or rotated along movement axis 24, as shown with box 540. Image data, e.g., image data 26 (shown in FIG. 1), is generated using x-rays received at the x-ray detector, as shown with box 550, and a imagery of the industrial article generated. In accordance with certain embodiments, the imaging method can include the use of a computed tomography (CT) imaging technique entailing movement of the industrial article while supported by the inspection fixture.

In certain embodiments inspection fixtures described herein can be arranged to support industrial articles during imaging that are difficult support, for example, when the region of interest is offset from the center of mass of the industrial article. In accordance with certain embodiments, inspection fixtures described herein are adjustable, a given inspection fixture being reconfigurable to support a selected industrial article in more than one orientation and/or support more than a single type of industrial article. It is contemplated that, in accordance with certain embodiments, inspection fixtures described herein can support high aspect ratio and/or massive articles during movement without inertial shifts due to rotation of the industrial article during imaging.

The methods and systems of the present disclosure, as described above and shown in the drawings, provide for inspection fixtures with superior properties including radiolucent construction and stiffness sufficient to limit (or eliminate entirely) artifacts in imagery acquired of industrial articles supported in the inspection fixtures. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An inspection arrangement, comprising:
   an inspection fixture, the inspection fixture having:
   a base member;
   a support member coupled to base member; and
   an intermediate member coupled to the support member, wherein the support member includes a radiolucent material for limiting artifacts in imagery acquired of an industrial article supported by the inspection fixture;
   an x-ray source arranged on one side of the inspection fixture;
   an x-ray detector spaced on another side of the inspection fixture, the x-ray source and the x-ray detector defining an inspection axis that intersects the inspection fixture; and
   a drive mechanism operably coupled to the inspection fixture for displacing the inspection fixture relative to the inspection axis,
   wherein the base defines an array of blind apertures in a surface of the base member, wherein the support member comprises a carbon fiber tube slidably received within a blind aperture of the aperture array, wherein the intermediate member comprises:
   a first intermediate member fixed to the surface of the base member at a location adjacent to the blind aperture; and
   a second intermediate member coupled to the U-lock with the support member arranged therebetween, the first and second intermediate member fixing the support member to the base member.

2. The inspection arrangement as recited in claim 1, wherein one or more of the intermediate member, support member, and the intermediate member are electrically conductive.

3. The inspection arrangement as recited in claim 1, wherein one or more of the base member, the intermediate member, and the support member include a carbon fiber composite or carbon black.

4. The inspection arrangement as recited in claim 1, further comprising a stiffener defining a fastener pattern coupled to the base member.

5. The inspection arrangement as recited in claim 1, wherein the intermediate member includes a radiolucent band or strap coupled to the support member.

6. The inspection arrangement as recited in claim 1, further comprising polymer tape or fasteners coupling the radiolucent band or strap to the base member.

7. The inspection arrangement as recited in claim 1, wherein the base member includes a plurality of lateral flanges connected to a backing.

8. The inspection arrangement as recited in claim 1, wherein the base member has a surface defining an array of blind apertures extending into an interior of the base member.

9. The inspection arrangement as recited in claim 1, wherein the support member includes a tube slidably received within a blind aperture of the base member.

10. The inspection arrangement as recited in claim 1, wherein the intermediate member includes a first intermediate member, abutting the base member and support member, and a second intermediate member, fastened to the first intermediate member.

11. The inspection arrangement as recited in claim 1, further comprising an end cap coupled to an end of the support member opposite the base member.

12. The inspection arrangement as recited in claim 1, wherein the support member is orthogonal relative to the base member.

13. The inspection arrangement as recited in claim 1, wherein the support member is parallel to the base member.

14. The inspection arrangement as recited in claim 1, wherein the support member is oblique relative to the base member.

15. The inspection arrangement as recited in claim 1, further comprising a back plate coupling the support member to the base plate, the support being spaced apart from the base plate.

16. The inspection arrangement as recited in claim 1, wherein the base member, the support member and the intermediate member each comprises a radiolucent carbon material, and further comprising a radiopaque stiffener defining a fastener pattern coupled to the base member.

17. The inspection arrangement as recited in claim 1, wherein the base member comprises a three-dimensionally modeled polymer body, wherein the support member comprises a foam core with an epoxy and carbon fiber fabric skin disposed thereon, and wherein the intermediate member comprises a radiolucent strap.

18. An imaging method, comprising:
at an inspection fixture of an inspection arrangement, the inspection fixture comprising a base member, a support member coupled to base member, and an intermediate member coupled to the support member, at least one of the base and support members comprising a radiolucent material for limiting artifacts in imagery acquired of an industrial article supported by the inspection fixture, securing an industrial article to the support member;
grounding the industrial article through the support member;
displacing the industrial article relative to an x-ray source and x-ray detector; and
generating image data of the industrial article using x-ray communicated through the support member and the industrial article,
wherein the inspection arrangement further includes:
an x-ray source arranged on one side of the inspection fixture;
an x-ray detector spaced on another side of the inspection fixture, the x-ray source and the x-ray detector defining an inspection axis that intersects the inspection fixture; and
a drive mechanism operably coupled to the inspection fixture for displacing the inspection fixture relative to the inspection axis,
wherein the base defines an array of blind apertures in a surface of the base member, wherein the support member comprises a carbon fiber tube slidably received within a blind aperture of the aperture array, wherein the intermediate member comprises:
a first intermediate member fixed to the surface of the base member at a location adjacent to the blind aperture; and
a second intermediate member coupled to the U-lock with the support member arranged therebetween, the first and second intermediate member fixing the support member to the base member.

* * * * *